United States Patent [19]

Kobayashi et al.

[11] Patent Number: 5,073,685

[45] Date of Patent: Dec. 17, 1991

[54] COORDINATE INPUT APPARATUS AND A WIRELESS INPUT PEN

[75] Inventors: Katsuyuki Kobayashi, Tokyo; Kiyoshi Kaneko, Yokohama; Ryohzou Yanagisawa, Matsudo; Yuichiroh Yoshimura, Yokohama; Atsushi Tanaka; Shinnosuke Taniishi, both of Kawasaki; Takeshi Kamono, Yokohama, all of Japan

[73] Assignee: Canon Kabushiki Kaisha, Tokyo, Japan

[21] Appl. No.: 603,625

[22] Filed: Oct. 26, 1990

[30] Foreign Application Priority Data

Oct. 27, 1989 [JP] Japan ................................ 1-278668

[51] Int. Cl.⁵ ............................................ G08C 21/00
[52] U.S. Cl. ......................................... 178/18; 17/19; 340/706; 310/311; 367/907; 364/521
[58] Field of Search .................... 178/18, 29; 340/706; 310/311; 367/907; 364/521

[56] References Cited

U.S. PATENT DOCUMENTS 4,931,965 6/1990 Kaneko et al. .................. 178/18 X Primary Examiner—Stafford D. Schreyer
Attorney, Agent, or Firm—Fitzpatrick, Cella, Harper & Scinto

[57] ABSTRACT

A coordinate input apparatus includes a wireless vibrating input pen for alternately generating a first vibration having a first frequency and a second vibration having a second frequency different from the first frequency. A vibration transmitting member is provided for transmitting the first and second vibrations input from the vibrating input pen by contacting the vibrating input pen. A plurality of vibration detectors are coupled to the vibration transmitting member for detecting the first and second vibrations transmitted through the vibration transmitting member. Processing circuitry is included for deriving at least one coordinate of a position of the vibrating input pen on the transmitting member according to a transmission delay time between the first and second vibrations detected by the vibration detectors. Transmission and reception of timing information between the vibrating input pen and the main body of the apparatus is not required. Hence, it becomes possible to provide a wireless vibrating input pen.

20 Claims, 5 Drawing Sheets

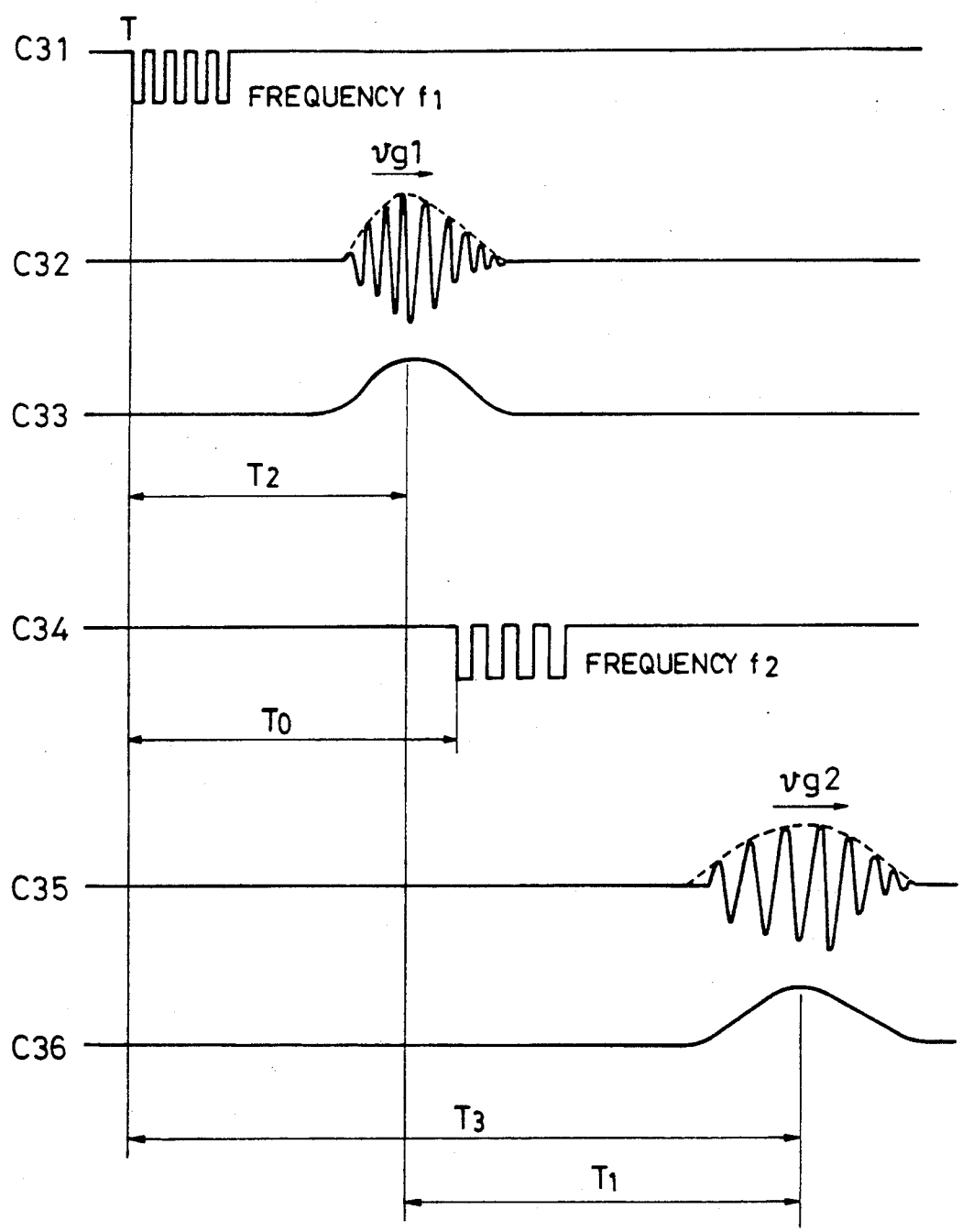

COORDINATE INPUT APPARATUS AND A WIRELESS INPUT PEN

BACKGROUND OF THE INVENTION

1. Field of the Invention

This invention relates to a coordinate input apparatus, and more particularly, to a wireless vibrating input pen and a coordinate input apparatus which detects a coordinate of an input point of vibration from the vibrating pen by detecting an elastic-wave vibration input from the vibrating pen by a plurality of sensors provided on a vibration transmitting plate.

2. Description of the Related Art

As apparatuses for inputting hand-written characters, figures and the like into processing apparatuses, such as computers and the like, coordinate input apparatuses using various kinds of input pens, tablets and the like have been known. In these kinds of apparatuses, image information consisting of input characters, figures and the like is displayed on display units, such as CRT displays and the like, or output to recorders, such as printers and the like. As methods of detecting a coordinate in tablet-type coordinate input apparatuses, the following methods have been known:

(1) A method in which an apparatus has a resistive film and a sheet material facing it, and the value of the coordinate of a pressed point is detected by a change in the resistance value of the point.

(2) A method in which the position of the coordinate is detected utilizing an electromagnetic or electrostatic induction between conductive sheets or the like facing each other.

(3) A method in which the position of the coordinate of an input pen is detected utilizing an ultrasonic vibration transmitted from the input pen to a tablet.

However, conventional coordinate input apparatuses adopting the above-described methods have the following disadvantages:

That is, in the above-described method using a resistive film (case (1)), since uniformity in a resistor directly influences accuracy in the input of a figure, a resistor having extremely high uniformity is needed. As a result, the resistor becomes very expensive. In addition, since two resistive films, that is, one for the x coordinate and the other for the y coordinate, are needed, transparency of a coordinate input surface is reduced. As a result, when, for example, the input surface is used superposed on an original or the like, the surface of the original becomes illegible.

Second, in the method utilizing electromagnetic induction (case (2)), since electric wires are arranged in the form of a matrix, a coordinate input surface is not transparent, and so is unsuitable to be used superposed on an original, a display unit, or the like.

Third, in conventional coordinate input apparatuses utilizing ultrasonic waves (case (3)), a method of detecting a delay time until the vibration generated by the input pen propagates within a propagation medium and reaches a transducer has been used. In this method, it is necessary to know a time to be used as a reference for detecting the delay time (for example, a time when the vibration is generated by the input pen). Accordingly, it has been necessary to continuously input information regarding the time when the vibration is generated by the input pen to a circuit for detecting a transmission delay time. Hence, the input pen for generating vibration must have been connected to the main body via a cable or the like. As a result, when characters, figures and the like are input using such a coordinate input apparatus, operability is reduced. Furthermore, when a signal from the apparatus is transmitted using radio waves or the like, the pen must incorporate a trasmitter and the like. Hence, it has been difficult to realize the same shape, weight and operability as those of a normal writing tool. However, if the above-described problems in the ultrasonic method were solved, the ultrasonic method would be able to provide a low-cost apparatus, since this method does not have the above-described disadvantages of the other methods, and provides a relatively simple mechanical structure.

SUMMARY OF THE INVENTION

The present invention has been made in consideration of the above-described problems.

It is an object of the present invention to provide a coordinate input apparatus utilizing an ultrasonic vibration wherein cost is reduced and operability is improved by making transmission and reception of a signal unnecessary and so removing a connection cable or the like between a vibrating input pen and the circuitry which detects the coordinate position.

It is another object of the present invention to provide a coordinate input apparatus comprising a vibrating input pen for alternately generating a vibration having a first frequency and a vibration having a second frequency different from the first frequency, a vibration transmitting member for transmitting the vibrations input from the vibrating input pen by contacting the vibrating input pen, vibration detection means coupled to the vibration transmitting member for detecting the vibrations transmitted through the vibration transmitting member, and derivation means for deriving a coordinate of a position contacted by the vibrating input pen according to a transmission delay time between the vibration having the first frequency and the vibration having the second frequency detected by the vibration detection means.

It is still another object of the present invention to provide a coordinate input apparatus comprising a vibrating input pen for generating a vibration having a second frequency a predetermined period of time after generating a vibration having a first frequency, a vibration transmitting member for transmitting the vibration having the first frequency and the vibration having the second frequency input from the vibrating input pen by contacting the vibrating input pen, vibration detection means coupled to the vibration transmitting member for detecting the vibrations transmitted through the vibration transmitting means, and derivation means for deriving a coordinate of a position contacted by the vibrating input pen according to the value of the predetermined period of time, group velocities of the vibrations having the first and second frequencies, and a transmission delay time between the vibration having the first frequency and the vibration having the second frequency detected by the vibration detection means.

Another object of the present invention is to provide a coordinate input apparatus comprising a vibration transmitting member, a vibrating input pen for inputting vibrations to be transmitted through said vibration transmitting member, and processing means, coupled to the transmitting member for deriving a position of at least one coordinate on the vibration transmitting member of the vibration input pen by detecting the vibration input from the vibrating input pen to the transmitting member. Vibration generation means are disposed within the input pen and generate a first vibration having a first frequency and a second vibration having a second frequency with a predetermined time difference between the vibrations. The processing means derives the position of the coordinate from a transmission delay time between the first and second vibrations transmitted through the vibration transmitting member, and the predetermined time difference.

A further object of the present invention is to provide a coordinate input apparatus comprising a vibration transmitting member and a vibrating input pen for inputting vibrations to be transmitted through the vibration transmitting member. Processing means are coupled to the transmitting member and derive a position of at least one coordinate on the vibration transmitting member of said vibrating input pen by detecting the vibrations input from the vibrating input pen to the vibration transmitting member. Signal forming means are disposed within the input pen and include (a) generation means for generating a pulse signal having a basic frequency, (b) frequency division means for performing frequency division on the pulse signal generated by the generation means to generate a pulse signal having a first frequency and a pulse signal having a second frequency, and (c) vibration generation means for generating a first vibration having the first frequency in response to the pulse signals generated by the frequency division means. The processing means derive the position of the coordinate from a transmission delay time between the first and second vibrations transmitted through the vibration transmitting member, and a predetermined time difference between the first and second vibrations.

Another object of the present invention is to provide a coordinate input apparatus comprising a vibration transmitting member and a vibrating input pen for inputting vibrations to be transmitted through the vibration transmitting member. Processing means are coupled to the transmitting member and derive a position of at least one coordinate on the vibration transmitting member of said vibrating input pen by detecting the vibrations input from said vibrating input pen to said vibration transmitting member. Signal forming means are disposed within the input pen and include (a) generation means for generating a pulse signal having a basic frequency, (b) frequency division means for performing frequency division on the pulse signal generated by the generation means to generate a pulse signal having a first frequency and a pulse signal having a second frequency, (c) switching means for switching between the pulse signal having the first frequency and the pulse signal having the second frequency to output the switched pulse signal, and (d) vibration generation means for generating a first vibration having the first frequency and a second vibration having the second frequency in response to the pulse signals output from the switching means. The processing means derives the position of the coordinate from a transmission delay time between the first and second vibrations transmitted through the vibration transmitting member, and a predetermined time difference between the first and second vibrations.

Yet another object of the present invention is to provide a wireless position encoder comprising a vibration propagating member for propagating first and second vibrations at different speeds, the first and second vibrations having different frequencies. A wireless input stylus is provided, unconnected to said propagating member, for generating and inputting the first and second vibrations to the propagating member. A plurality of vibration sensors sense the first and second vibrations propagating in the propagating member, and processing circuitry is coupled to the sensors and determines a location on the propagating member where the stylus inputted the first and second vibrations.

According to yet another object of the present invention, a wireless input stylus for use with (a) a vibration propagating member which propagates first and second vibrations at different speeds, the first and second vibrations having different frequencies, (b) a plurality of vibration sensors for sensing the first and second vibrations propagating in the propagating member, and (c) processing circuitry, coupled to the sensors for determining a locating on the propagating member where said stylus inputs the first and second vibrations, said stylus includes a vibration transmitting tip for transmitting the first and second vibrations to the propagating member, vibration generating circuitry, coupled to the tip, for generating the first and second vibrations, and means for holding a battery and for supplying electric power therefrom to said vibration generating circuitry.

It is still another object of the present invention to provide a coordinate input apparatus capable of providing a wireless vibrating input pen.

BRIEF DESCRIPTION OF THE DRAWINGS

FIG. 3 is a diagram for explaining the principle of vibration transmission in the embodiment;

DETAILED DESCRIPTION OF THE PREFERRED EMBODIMENT

The preferred embodiment of the present invention will now be explained in detail by reference to the attached drawings.

Figure 1A:
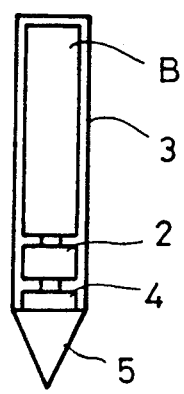
FIG. 1(A) is a block diagram showing the schematic configuration of a vibrating pen according to an embodiment of the present invention.
Figure 1B:
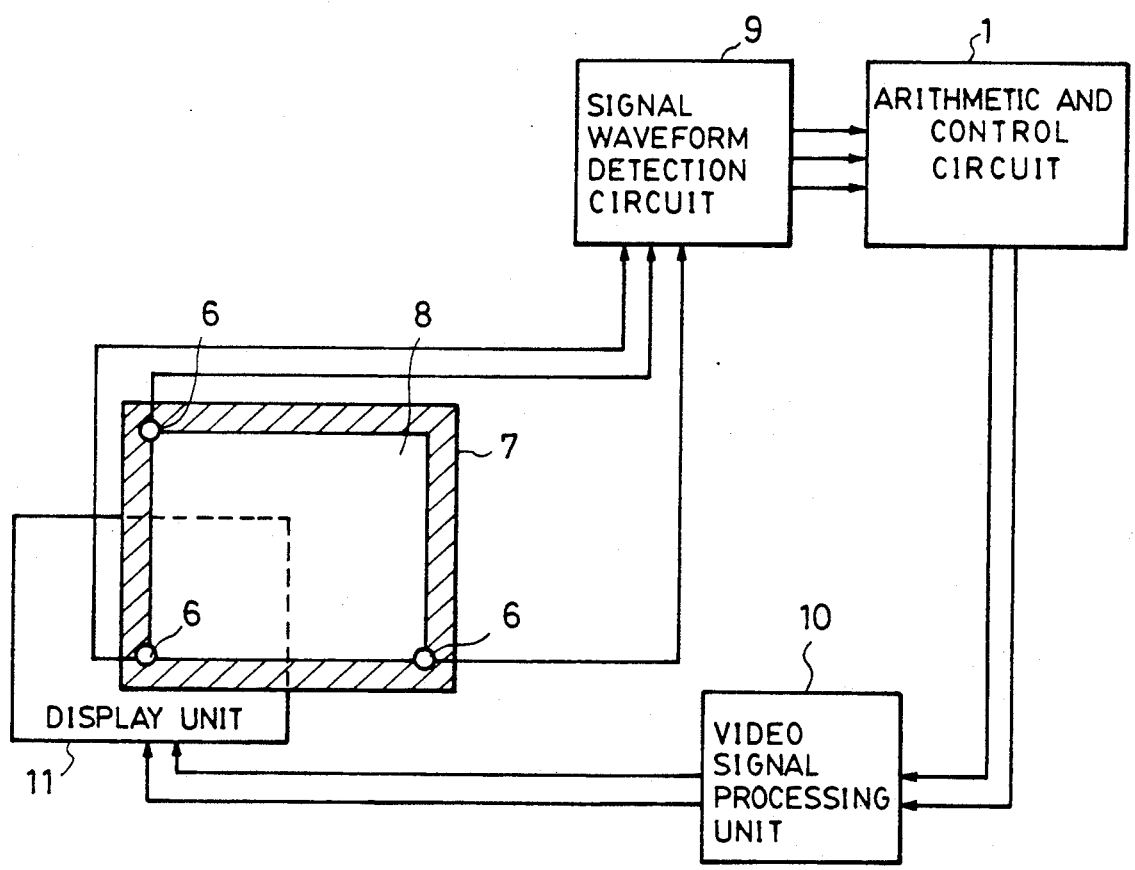
FIG. 1(B) is a block diagram showing the schematic configuration of an information input/output apparatus of the embodiment.

FIG. 1(A) is a block diagram showing the configuration of a vibrating pen 3 according to the present embodiment. FIG. 1(B) is a block diagram showing the schematic configuration of an information input/output apparatus of the present embodiment.

In FIG. 1(B), the information input/output apparatus inputs a coordinate on an input tablet comprising a vibration transmitting plate 8 using the vibrating pen 3, and displays an input image on a display unit 11, such as a CRT or the like, arranged superposed under the input tablet, in accordance with the input coordinate information.

In FIG. 1(B), the vibration transmitting plate 8, made of acrylic resin, a glass plate or the like, transmits vibrations transmitted from the vibrating pen 3 to three vibration sensors 6 provided at corner portions of the vibration transmitting plate 8. In the present embodiment, by measuring transmission times of ultrasonic vibrations transmitted from the vibrating pen 3 to the vibration sensors 6 via the vibration transmitting plate 8, it is possible to detect the coordinate or location of the vibrating pen 3 on the vibration transmitting plate 8.

In order to prevent the vibrations transmitted from the vibrating pen 3 from returning toward a central portion of plate 8 after being reflected at circumferential portions thereof, circumferential portions of the vibration transmitting plate 8 are supported by an anti-reflection or vibration damping material 7 made of silicone rubber or the like.

The vibration transmitting plate 8 is disposed on the display unit 11 which is capable of performing dot display, such as a CRT (or a liquid-crystal display or the like), so that dot display is performed at positions traced by the vibrating pen 3. That is, dot display is performed at positions corresponding to detected coordinates of the vibrating pen 3 on the display unit 11. As a result, an image composed of elements, such as points, lines and the like, input from the vibrating pen 3 is displayed on the display unit 11 so that the image appears after the passage of the vibrating pen 3 as if the image were written on a sheet of paper.

According to such a configuration, it is also possible to use different input methods, such as displaying menus on the display unit 11 and selecting a menu item using the vibrating pen 3, displaying a prompt mark and contacting the vibrating pen 3 at a predetermined position, and the like.

In FIG. 1(A), the vibrating pen 3 for transmitting ultrasonic vibrations to the vibration transmitting plate 8 incorporates a vibrator 4 composed of a piezoelectric element and the like. An ultrasonic vibration generated by the vibrator 4 is transmitted to the vibration transmitting plate 8 via a horn unit 5 having a pointed distal end.

The vibrating pen 3 also incorporates a vibrator driving circuit 2 for driving the vibrator 4, and a vibrator driving power supply B composed of a battery or the like. Contrary to the prior art, transmission and reception of an electric synchronizing signal with the input tablet or the main body of the apparatus are not performed. An electric driving signal generated by the vibrator driving circuit 2 is transformed into a mechanical ultrasonic vibration by the vibrator 4, and the vibration is transmitted to the vibration transmitting plate 8 via the horn unit 5.

The vibration sensors 6 provided at corner portions of the vibration transmitting plate 8 are composed of mechanical-to-electrical transducers, such as piezoelectric elements or the like. Respective outputs from the three vibration sensors 6 are input to a signal waveform detection circuit 9, and is converted into detection signals processable by an arithmetic and control circuit 1 in the following stage. The arithmetic and control circuit 1 measures transmission times of vibrations, and detects the position of the coordinate of the vibrating pen 3 on the vibration transmitting plate 8.

The detected information on the coordinate of the vibrating pen 3 is processed in the arithmetic and control circuit 1 in accordance with a method of output from the display unit 11. That is, the arithmetic and control circuit 1 controls the output operation of the display unit 11 via a video signal processing unit 10 according to the input information regarding the coordinate.

Figure 2:
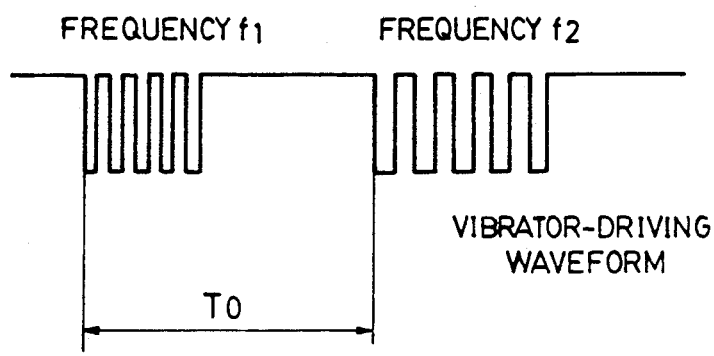
FIG. 2(A) is a diagram showing examples of waveforms of vibrations having different frequencies output from the vibrating pen.
FIG. 2(B) is a diagram showing coordinate position assignment performed by the vibrating pen.
FIG. 2(C) is a diagram showing examples of waveforms of vibrations transmitted from the vibrating pen and detected by a sensor.
Figure 2:
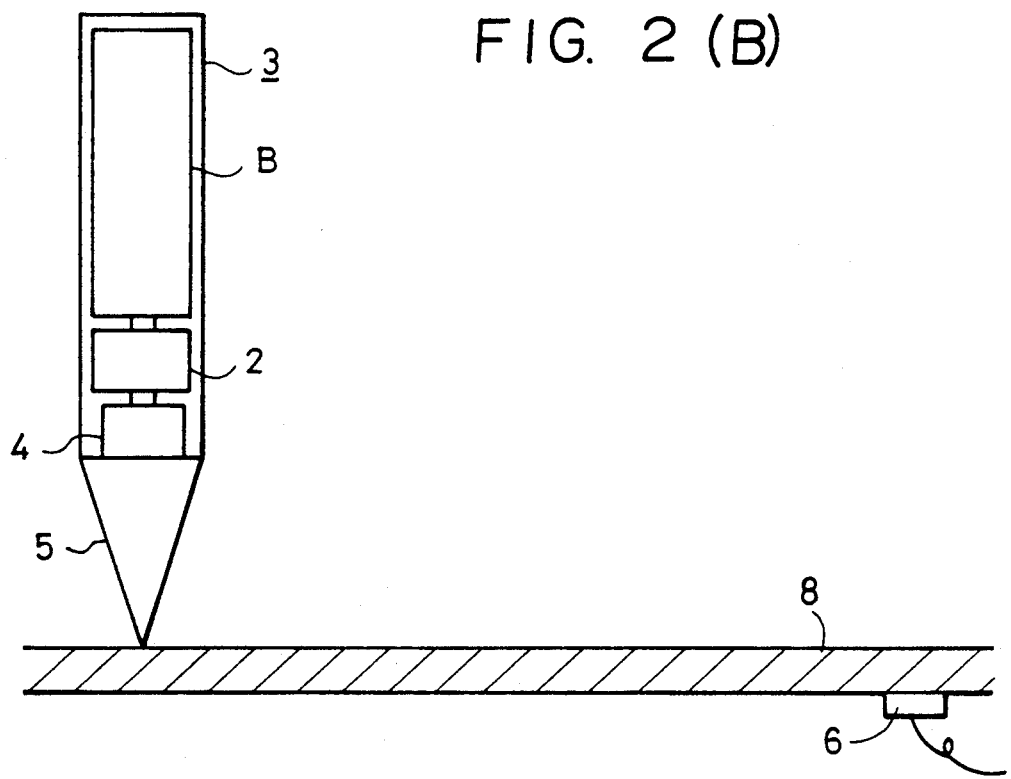
Figure 2:
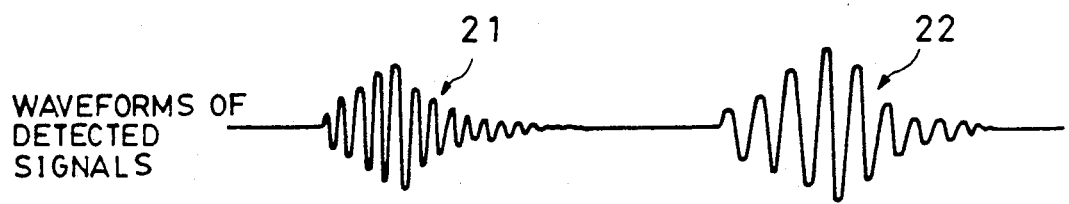

FIG. 2(A) shows vibrator-driving waveforms for driving the vibrator 4 within the vibrating pen 3.

As shown in FIG. 2(A), the vibrator driving circuit 2 can input rectangular-wave pulse trains having frequencies $f_1$ and $f_2$ (each having a predetermined length) to the vibrator 4. That is, after a predetermined time $T_0$ after inputting the rectangular-wave pulse train having the frequency $f_1$ and the predetermined length to the vibrator 4, the vibrator driving circuit 2 inputs the rectangular-wave pulse train having the frequency $f_2$ and the predetermined length to the vibrator 4. Electric energy thus input is converted into mechanical energy by the vibrator 4, as shown in FIG. 2(B). The mechanical energy is converted again into electric energy by the vibration sensor 6 via the vibration transmitting plate 8, and the electric energy is output.

FIG. 2(C) shows the waveforms of detected signals output from the vibration sensor 6 at that time. Portion 21 shows the waveform of the transmitted pulse train having the frequency $f_1$, and portion 22 shows the waveform of the transmitted pulse train having the frequency $f_2$.

The time $T_0$ is set so that the waveform of the detected signal formed by the previously-input pulse train having the frequency $f_1$ and the waveform of the detected signal formed by the pulse train having the frequency $f_2$ are not distorted as a result of interfering with each other. The length of each pulse train and the magnitude of driving voltage for each pulse train is set so that a sufficiently large waveform can be obtained for each detected signal.

Figure 5:
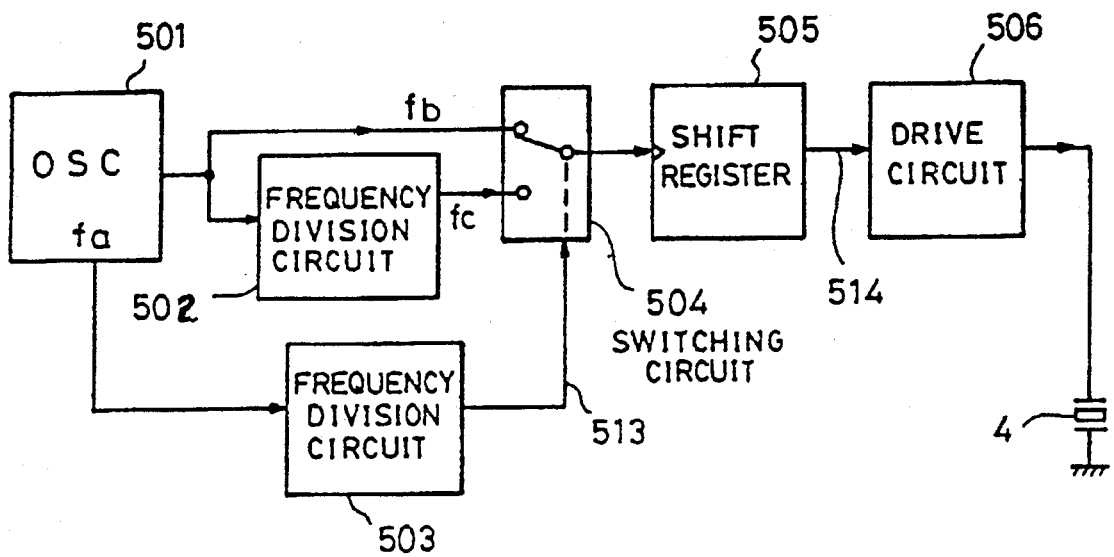
FIG. 5(A) is a diagram showing the configuration of a driving circuit for a vibrator of the vibrating pen in the embodiment.
FIG. 5(B) illustrates timing charts for signals from respective units shown in FIG. 5(A).
Figure 5:
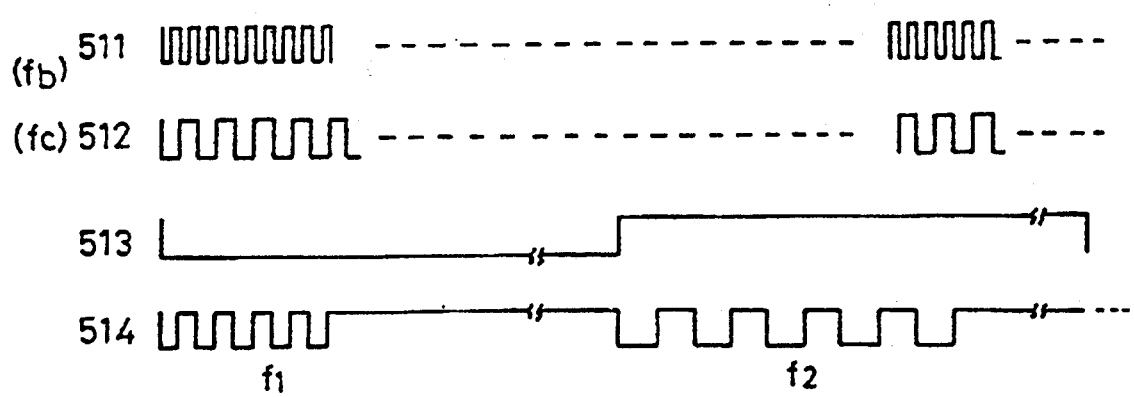

FIG. 5(A) is a block diagram showing the configuration of the vibrator driving circuit 2. FIG. 5(B) illustrates timing charts for the vibrator driving circuit 2.

In FIG. 5(A), an oscillator (OSC) 501 oscillates and outputs clock signals having frequencies $f_a$ and $f_b$. The clock signal $f_b$ (timing chart 511 in FIG. 5(B)) is converted by frequency division into a clock signal having a frequency $f_c$ (timing chart 512) by a frequency division circuit 502, and the signals $f_b$ and $f_c$ are input to a switching circuit 504. The other clock signal $f_a$ output from the OSC 501 is converted by frequency division by another frequency division circuit 503 into a clock signal shown in timing chart 513. The switching circuit 504 alternately selects between the clock signals having the frequencies $f_b$ and $f_c$ in accordance with the clock signal 513, and outputs the selected signal to a shift register 505.

The shift register 505 is configured so as to output a pulse train 514 having a few clock pulses (4.5 clock pulses in the case of the present embodiment) immediately after the clock signal 513 has changed. The frequency of the pulse train 514 depends on the frequencies $f_b$ and $f_c$. As a result, clock pulses having the frequencies $f_1$ and $f_2$ represented by the clock signal 514 are alternately output immediately after the clock signal 513 has changed, as shown by the timing charts in FIG. 5(B). A drive circuit 506 converts the clock signal 514 output from the shift register 505 into an electric signal having an optimum level for driving the vibrator 4.

The property of a plate wave transmitted through the vibration transmitting plate 8 will now be described.

It is well known that the propagation velocity of a plate wave transmitted through the vibration transmitting plate 8 is determined by the material and thickness of the plate, and the frequency of the wave. In the coordinate input apparatus of the present embodiment, since the material and thickness of the vibration transmitting plate 8 are constant, the propagation velocity of a plate wave propagating through the vibration transmitting plate 8 necessarily differs if the frequency differs. The values of the group velocity $v_{g1}$ of the plate wave generated by the vibration having the frequency $f_1$ and transmitted through the vibration transmitting plate 8, and the group velocity $v_{g2}$ of the plate wave generated by the vibration having the frequency $f_2$ are previously obtained and used as constant FIG. 3 is a diagram for explaining the principle of transmission of vibration propagating through the vibration transmitting plate 8, wherein time T (when a pulse train having the frequency $f_1$ is generated) is made a reference point. The wave generated by the pulse train having the frequency $f_1$ is transmitted through the vibration transmitting plate 8, and is detected by the sensor 6. The sensor output is shown by C32. If, for example, an envelope C33 is formed by tracing singular points in the wave, and the peak point in the envelop C33 is assumed as a transmission delay time, the delay time is represented by $T_2$.

C34 represents a pulse train having the frequency $f_2$ output from the vibrating input pen 3, and C35 represents a sensor output as a result of detection of this pulse train by the sensor 6. The pulse train having the frequency $f_2$ is delayed from the pulse train having the frequency $f_1$ by time $T_0$. The transmission delay time for the wave generated by the pulse train having the frequency $f_2$ is detected as $T_1$ by the sensor 6. The transmission delay time from the moment when the pulse train having the frequency $f_2$ is generated until the wave generated by the pulse train actually arrives at the sensor 6 is $(T_3 - T_0)$, the distance is calculated by the following method.

If the distance between the vibrating pen 3 and the sensor 6 is represented by l, $$l = v_{g1} T_2 \quad (1)$$

$$l = v_{g2}(T_3 - T_0) \quad (2).$$

In these and the following expressions, only the time $T_1$ can be measured, and the time $T_0$ is a constant.

By modifying the above expressions, we obtain:

$$T_2 = l/v_{g1} \quad (3)$$

$$T_3 = T_2 + T_1 \quad (4).$$

By solving expressions (2)−(4) for l, we obtain:

$$l = v_{g1} v_{g2}(T_1 - T_0)/(v_{g1} - v_{g2}) \quad (5).$$

This result indicates that, even if the time of the generation of the vibration having the frequency $f_1$ cannot be obtained, the distance between the point input by the vibrating input pen 3 and the sensor 6 can be calculated if the time difference $T_0$ between the two input pulse trains having different frequencies and the difference $T_1$ between transmission delay times of detected waveforms of waves generated by the two pulse trains are known.

If the distance between the point input by the vibrating pen 3 and the vibration sensor 6 can be thus calculated, the value of the orthogonal coordinates on the vibration transmitting plate 8 can be obtained according to the calculated distance.

Accordingly, it becomes possible to determine the distance between the vibrating input pen 3 and the sensor 6 without detecting the input timing of the vibration from the vibrating input pen 3 unlike in the prior art. Hence, it is possible to provide a coordinate input apparatus which does not necessitate transmission and reception of a synchronizing signal between the vibrating input pen 3 and the apparatus.

Figure 4:
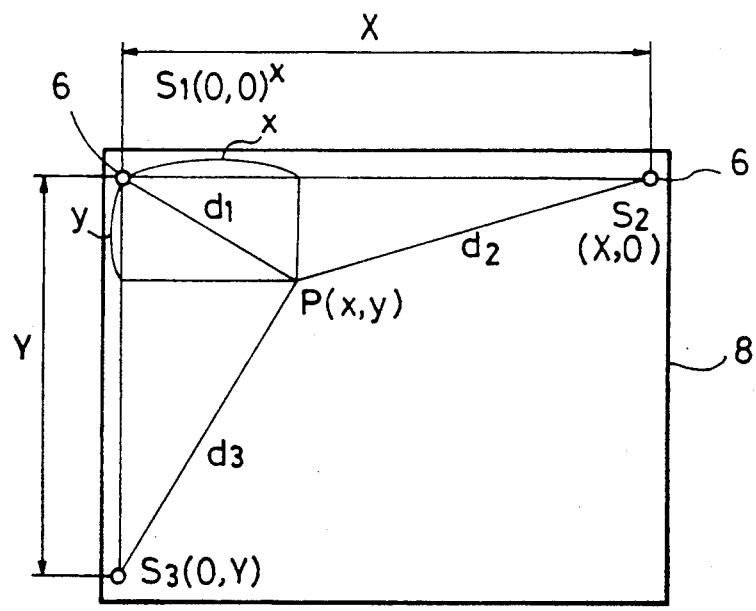
FIG. 4 is a diagram showing the principle for obtaining the orthogonal coordinate of the vibrating pen on a vibration transmitting plate.

FIG. 4 is a diagram showing the principle for obtaining the orthogonal coordinates of the position of the vibrating input pen 3 on the vibration transmitting plate 8. When the three vibration sensors 6 are disposed at positions S1-S3 at corner portions on the vibration transmitting plate 8, if straight distances $d_1$, $d_2$ and $d_3$ from the input point to the respective vibration sensors 6 are calculated using expression (5), the coordinate (x, y) of the position P of the vibrating input pen 3 can be obtained from the theorem of three squares as shown in the following expressions:

$$x = X/2 + (d_1 + d_2)(d_1 - d_2)/2X$$

$$y = Y/2 + (d_1 + d_3)(d_1 - d_3)/2Y.$$

In these expressions, X and Y are distances along the X and Y axes between the vibration sensors 6 at positions $S_2$ and $S_3$ and the sensor 6 at the origin (position $S_1$ (0, 0)), respectively.

As described above, the position coordinates of the vibrating pen 3 can be detected. By repeating the above-described processing, the positions of coordinates input by the vibrating pen 3 can be sequentially detected in real time.

As explained above, according to the present embodiment, since the position of a coordinate input by the vibrating pen 3 can be detected without knowing the input timing of the vibrating pen 3 at the detection unit, it becomes unnecessary to transmit and receive timing information between the main body of the apparatus having the vibration transmitting plate 8 and the vibrating pen 3. Since a wire connecting the vibrating pen 3 and the main body of the apparatus thereby becomes unnecessary, it is possible to provide a wireless apparatus, and to remarkably improve operability in an input operation.

Although, in the above-described embodiment, an explanation has been provided of the case of an apparatus having a transparent vibration transmitting plate superposed on a display unit or an original, an opaque material, such as metal or the like, may of course be used when it is unnecessary to use the apparatus superposed on a display unit or an original.

As explained above, according to the present invention, it becomes unnecessary to know the input timing information for the input of a vibration from the vibrating pen. Hence, it is possible to remove transmission and reception of a signal between the vibrating input pen and the main body of the apparatus, and to provide a wireless vibrating input pen. As a result, the present invention has the excellent effect that operability of the apparatus may be remarkably improved.

The individual components shown in outline or designated by blocks in the Drawings are all well-known in the coordinate input arts and their specific construction and operation are not critical to the operation or best mode for carrying out the invention.

While the present invention has been described with respect to what is presently considered to be the preferred embodiment, it is to be understood that the invention is not limited to the disclosed embodiment. To the contrary, the invention is intended to cover various modifications and equivalent arrangements included within the spirit and scope of the following claims. The scope of the following claims is to be accorded the broadest interpretation so as to encompass all such modifications and equivalent structures and functions.

What is claimed is:

1. A coordinate input apparatus comprising:
   a vibrating input pen for alternately generating a first vibration having a first frequency and a second vibration having a second frequency different from the first frequency;
   a vibration transmitting member for transmitting the first and second vibrations input from said vibrating input pen by contacting the vibrating input pen;
   vibration detection means coupled to said vibration transmitting member for detecting the first and second vibrations transmitted through said vibration transmitting member; and
   derivation means for deriving a location of said vibrating input pen on said vibration transmitting member according to a transmission delay time between the first vibration and the second vibration detected by said vibration detection means.

2. A coordinate input apparatus according to claim 1, wherein said vibrating input pen includes a piezoelectric element for generating the first and second vibrations.

3. A coordinate input apparatus according to claim 1, wherein said vibration transmitting member comprises one of a transparent acrylic-resin plate and a glass plate, and further comprising a display unit, disposed adjacent said vibration transmitting member, for displaying the contact position derived by said derivation means.

4. A coordinate input apparatus according to claim 1, wherein said vibrating input pen comprises:
   generation means for generating a pulse signal having a basic frequency;
   frequency division means for performing frequency division on the pulse signal generated by said generation means to generate a pulse signal having the first frequency and a pulse signal having the second frequency; and
   vibration generation means for generating the first and second vibrations in response to the pulse signals generated by said frequency division means.

5. A coordinate input apparatus comprising:
   a vibrating input pen for generating a second vibration having a second frequency a predetermined period of time after generating a first vibration having a first frequency;
   a vibration transmitting member for transmitting the first and second vibrations input from said vibrating input pen by contacting the vibrating input pen;
   vibration detection means coupled to said vibration transmitting member for detecting the first and second vibrations transmitted through said vibration transmitting member; and
   derivation means for deriving at least one coordinate of a position on said vibration transmitting member contacted by said vibrating input pen according to (a) said predetermined period of time, (b) respective group velocities of said first and second vibrations, and (c) a transmission delay time between the first and second vibrations detected by said vibration detection means.

6. A coordinate input apparatus according to claim 5, wherein said vibrating input pen includes a piezoelectric element for generating the first and second vibrations.

7. A coordinate input apparatus according to claim 5, wherein said vibration transmitting member comprises one of a transparent acrylic-resin plate and a glass plate, and further comprising a display unit, disposed adjacent said vibration transmitting member, for displaying the contact position derived by said derivation means.

8. A coordinate input apparatus according to claim 5, wherein said vibrating input pen comprises:
   generation means for generating a pulse signal having a basic frequency;
   frequency division means for performing frequency division on the pulse signal generated by said generation means to generate a pulse signal having the first frequency and a pulse signal having the second frequency; and
   vibration generation means for generating the first and second vibrations in response to the pulse signals generated by said frequency division means.

9. A coordinate input apparatus, comprising:
   a vibration transmitting member; and
   a vibrating input pen for inputting vibrations to be transmitted through said vibration transmitting member;
   processing means, coupled to said transmitting member, for deriving a position of at least one coordinate on said vibration transmitting member of said vibrating input pen by detecting the vibration input from said vibrating input pen to said vibration transmitting member; and
   vibration generation means, disposed within said input pen. for generating a first vibration having a first frequency and a second vibration having a second frequency with a predetermined time difference therebetween;
   said processing means deriving the position of the coordinate from a transmission delay time between the first and second vibrations transmitted through said vibration transmitting member, and said predetermined time difference.

10. A coordinate input apparatus according to claim 9, wherein the vibration generation means within said vibrating input pen comprises a piezoelectric element and means for driving said element.

11. A coordinate input appartus according to claim 9, wherein said vibration transmitting member comprises one of a transparent acrylic-resin plate and a glass plate, and further comprising a display unit, disposed adjacent said vibration transmitting member, for displaying the coordinate.

12. A coordinate input apparatus, comprising:
   a vibration transmitting member;
   a vibrating input pen for inputting vibrations to be transmitted through said vibration transmitting member;
   processing means, coupled to said transmitting member, for deriving a position of at least one coordinate on said vibration transmitting member of said vibrating input pen by detecting the vibrations input from said vibrating input pen to said vibration transmitting member; and signal forming means disposed within said iput pen and including (a) generation means for generating a pulse signal having a basic frequency, (b) frequency division means for performing frequency division on the pulse signal generated by said generation means to generate a pulse signal having a first frequency and a pulse signal having a second frequency, and (c) vibration generation means for generating a first vibration having the first frequency and a second vibration having the second frequency in response to the pulse signals generated by said frequency division means;

said processing means deriving the position of the coordinate from a transmission delay time between the first and second vibrations transmitted through said vibration transmitting member, and a predetermined time difference between the first and second vibrations.

13. A coordinate input apparatus according to claim 12, wherein said vibration generation means within said vibrating input pen comprises a piezoelectric element and means for driving said element.

14. A coordinate input apparatus according to claim 12, wherein said vibration transmitting member comprises one of a transparent acrylic-resin plate and a glass plate, and further comprises a display unit, disposed adjacent said vibration transmitting member, for displaying the coordinate.

15. A coordinate input apparatus comprising:
a vibration transmitting member;
a vibrating input pen for inputting vibrations to be transmitted through said vibration transmitting member;
processing means, coupled to said transmitting member, for deriving a position of at least one coordinate on said vibration transmitting member of said vibrating input pen by detecting the vibrations input from said vibrating input pen to said vibration transmitting member; and
signal forming means disposed within said input pen and including (a) generation means for generating a pulse signal having a basic frequency, (b) frequency division means for performing frequency division on the pulse signal generated by said generation means to generate a pulse signal having a first frequency and a pulse signal having a second frequency, (c) switching means for switching between the pulse signal having the first frequency and the pulse signal having the second frequency to output the switched pulse signal, and (d) vibration generation means for generating a first vibration having the first frequency and a second vibration having the second frequency in response to the pulse signals output from said switching means;
said processing means deriving the position of the coordinate from a transmission delay time between the first and second vibrations transmitted through said vibration transmitting member, and a predetermined time difference between the first and second vibrations.

16. A coordinate input apparatus according to claim 15, wherein the vibration generation means within said vibrating input pen comprises a piezoelectric element and means for driving said element.

17. A coordinate input apparatus according to claim 15, wherein said vibration transmitting member comprises one of a transparent acrylic-resin plate and a glass plate, and further comprises a display unit, disposed adjacent said transmitting member, for displaying the coordinate.

18. A wireless position encoder, comprising:
a vibration propagating member for propagating first and second vibrations having different frequencies;
a wireless input stylus, unconnected to said propagating members, for generating and inputting the first and second vibrations to said propagating member;
a plurality of vibration sensors for sensing the first and second vibrations propagating in said propagating member; and
processing circuitry, coupled to said sensors, for determining a location on said propagating member where said stylus inputted the first and second vibrations.

19. An encoder according to claim 18, wherein said stylus inputs the first and second vibrations with a predetermined time delay therebetween, and wherein said processing circuitry determines said location from (a) the predetermined time delay and (b) the different propagating speeds of the first and second vibrations between the input location to the sensors.

20. A wireless input stylus for use with (a) a vibration propagating member which propagates first and second vibrations having different frequencies, (b) a plurality of vibration sensors for sensing the first and second vibrations propagating in the propagating member, and (c) processing circuitry, coupled to the sensors, for determining a location on the propagating member where said stylus inputs the first and second vibrations, said stylus comprising:
a vibration transmitting tip for transmitting the first and second vibrations to the propagating member;
vibration generating circuitry, coupled to said tip, for generating the first and second vibrations, and
means for holding a battery and for supplying electric power therefrom to said vibration generating circuitry.

* * * * *

UNITED STATES PATENT AND TRADEMARK OFFICE
CERTIFICATE OF CORRECTION

PATENT NO. : 5,073,685
DATED : December 17, 1991
INVENTOR(S) : Katsuyuki Kobayashi, et al.

It is certified that error appears in the above-identified patent and that said Letters Patent is hereby corrected as shown below:

COLUMN 2

Line 5, "trasmitter" should read --transmitter--.

COLUMN 4

Line 18, "locating" should read --location--.

COLUMN 5

Line 63, "is" should read --are--.

COLUMN 7

Line 42, "$(T_3-T_0)$, the" should read --$(T_3-T_0)$. The--.

UNITED STATES PATENT AND TRADEMARK OFFICE
CERTIFICATE OF CORRECTION

PATENT NO. : 5,073,685
DATED : December 17, 1991
INVENTOR(S) : Katsuyuki Kobayashi, et al.

It is certified that error appears in the above-identified patent and that said Letters Patent is hereby corrected as shown below:

COLUMN 10

Line 32, "and" should be deleted; and
Line 56, "appartus" should read --apparatus--.

COLUMN 11

Line 5, "iput pen" should read --input pen--.

Signed and Sealed this

First Day of June, 1993

Attest:

MICHAEL K. KIRK

Attesting Officer

Acting Commissioner of Patents and Trademarks